United States Patent
Alarawi et al.

(10) Patent No.: US 12,344,798 B2
(45) Date of Patent: Jul. 1, 2025

(54) FOAMED ACID SYSTEM STABILIZED BY TWO DIMENSIONAL-GRAPHENE AND SURFACTANT COMPOSITE FOR FRACTURING APPLICATION

(71) Applicant: SAUDI ARABIAN OIL COMPANY, Dhahran (SA)

(72) Inventors: Abeer Ateeq Alarawi, Khobar (SA); Bader Ghazi Al-Harbi, Dammam (SA); Tamim Hassan Alshehri, Dhahran (SA); Ahmad S. Busaleh, Dhahran (SA); Abdullah Abbas Alrustum, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 18/326,890

(22) Filed: May 31, 2023

(65) Prior Publication Data
US 2024/0400889 A1    Dec. 5, 2024

(51) Int. Cl.
*C09K 8/70*  (2006.01)
*C09K 8/74*  (2006.01)
*E21B 37/06* (2006.01)
*E21B 43/27* (2006.01)

(52) U.S. Cl.
CPC ............. *C09K 8/703* (2013.01); *C09K 8/74* (2013.01); *E21B 37/06* (2013.01); *E21B 43/27* (2020.05); *C09K 2208/10* (2013.01); *C09K 2208/32* (2013.01)

(58) Field of Classification Search
CPC ...... C09K 8/703; C09K 8/74; C09K 2208/10; C09K 2208/32; E21B 43/27; E21B 37/06
See application file for complete search history.

(56) References Cited

U.S. PATENT DOCUMENTS

| | | | | |
|---|---|---|---|---|
| 9,969,928 B2* | 5/2018 | He | ............................ | E21B 43/16 |
| 10,077,606 B2* | 9/2018 | Hall | ........................ | C09K 8/524 |
| 10,077,636 B2* | 9/2018 | Marr | ........................ | C09K 8/524 |
| 2012/0245058 A1 | 9/2012 | Monteiro et al. | | |
| 2012/0285690 A1* | 11/2012 | Weaver | .................. | C09K 8/607 |
| | | | | 166/305.1 |
| 2017/0240804 A1* | 8/2017 | Tellez | ........................ | C09K 8/38 |
| 2018/0223175 A1* | 8/2018 | Al-Yami | .................. | C09K 8/04 |
| 2019/0016943 A1 | 1/2019 | Ren et al. | | |
| 2021/0207021 A1 | 7/2021 | Khamatnurova et al. | | |
| 2021/0363408 A1 | 11/2021 | Goual et al. | | |

OTHER PUBLICATIONS

Lv, Q. et al., "Study of Ultra-Dry CO2 Foam Fracturing Fluid Enhanced by Graphene Oxide," International Petroleum Technology Conference, IPTC-19295-MS, pp. 1-8, Mar. 28, 2019 (8 pages).
Neuberger, N. et al., "Graphene: A review of applications in the petroleum industry," Journal of Petroleum Science and Engineering, 167, pp. 152-159, Apr. 6, 2018 (27 pages).
Sikiru, S. et al., "Graphene: Outlook in the enhance oil recovery (EOR)," Journal of Molecular Liquids, 321, pp. 1-13, 2020 (13 pages).
Compton, O.C. et al., "Graphene Oxide, Highly Reduced Graphene Oxide, and Graphene: Versatile Building Blocks for Carbon-Based Materials," Small, 6(6), pp. 711-723, 2010 (13 pages).
Thakore, V. et al., "High-Temperature Stability of Aqueous Foams as Potential Waterless Hydrofracking Fluid for Geothermal Reservoir Stimulation," Proceedings, 45th Workshop on Geothermal Reservoir Engineering, Feb. 12, 2020 (10 pages).

* cited by examiner

*Primary Examiner* — Silvana C Runyan
(74) *Attorney, Agent, or Firm* — Osha Bergman Watanabe & Burton LLP

(57) ABSTRACT

A foamed composition includes a base fluid, a graphene particle, one or more surfactants, a gas, and an inorganic acid. The foamed composition has a foam quality in a range from 50 to 90 vol/vol % at a temperature in a range from 120° C. to 165° C. A method of stimulating a hydrocarbon-bearing formation includes introducing the foaming composition into the hydrocarbon-bearing formation under a pressure greater than fracturing pressure of the hydrocarbon-bearing formation to generate fractures in the hydrocarbon-bearing formation and generating a foam from the foaming composition inside the hydrocarbon-bearing formation using a gas. The foam has a half-life of 130 to 260 min at 200° F.

6 Claims, 4 Drawing Sheets

0 Min

0 Min

30 Min

2 Hours

1 Hour

100μm  4 Hours

FOAMED ACID SYSTEM STABILIZED BY TWO DIMENSIONAL-GRAPHENE AND SURFACTANT COMPOSITE FOR FRACTURING APPLICATION

BACKGROUND

Well stimulation enables the improved extraction of hydrocarbon reserves that conventional recovery processes, such as gas or water displacement, cannot access. One well stimulation technique that is widely employed is hydraulic fracturing, which involves the injection of a fluid into a formation at a pressure that is greater than the fracture pressure. This increases the size and extent of existing fractures within the formation and may create new fractures.

Hydraulic fracturing is used in the oil and gas industry to stimulate production in hydrocarbon-containing formations. It is an oil field production technique that involves injecting a pressurized fluid to artificially fracture subsurface formations. The fracturing is created after drilling a well by injecting suitable fluids such as water or chemicals into the well under pressure to induce fractures in a formation. For example, pressurized hydraulic fracturing fluids may be pumped into a subsurface formation to be treated, causing fractures to open in the subsurface formation. The fractures may extend away from the wellbore according to the natural stresses within the formation.

Hydraulic fractures may be generated in the hydrocarbon reservoir by pumping fluid, often primarily water, from a hydraulic fracturing unit on the surface through the wellhead and the wellbore. When the pressure in the wellbore is sufficiently increased by the pumping of the hydraulic fracturing unit on the surface, hydraulic fractures may be created within the hydrocarbon reservoir. Proppants, such as grains of sand or ceramic beads, may be provided with the pressurized hydraulic fracturing fluid, which may lodge into the hydraulically created fractures to keep the fracture open when the treatment pressure is released. The proppant-supported fractures may provide high-conductivity flow channels with a large area of formation to enhance hydrocarbon extraction.

A variety of fluids have been developed to withstand the high pump rates, shear stresses, and high temperatures and pressures a fracturing fluid may be exposed to. In particular, hydraulic fracturing fluids may be aqueous-based gels, emulsions, or foams. In such hydraulic fracturing fluids, complex chemical mixtures having sufficient viscosity properties may be included to generate fracture geometry in the formation rock and transport solid proppants holding the fracture open.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a foamed composition. The composition includes a base fluid, a graphene particle, one or more surfactants, a gas, and an inorganic acid. The foamed composition has a foam quality in a range from 50 to 90 vol/vol % at a temperature in a range from 120° C. to 165° C.

In another aspect, embodiments disclosed herein relate to a method of stimulating a hydrocarbon-bearing formation. The method includes introducing a foaming composition into the hydrocarbon-bearing formation under a pressure greater than fracturing pressure of the hydrocarbon-bearing formation to generate fractures in the hydrocarbon-bearing formation and generating a foam from the foaming composition inside the hydrocarbon-bearing formation using a gas. The foaming composition includes a base fluid, a graphene particle, one or more surfactants, a gas, and an inorganic acid. The foam has a half-life of 130 to 260 min at 200° F.

Other aspects and advantages of the claimed subject matter will be apparent from the following description and the appended claims.

DETAILED DESCRIPTION

Figure 1:
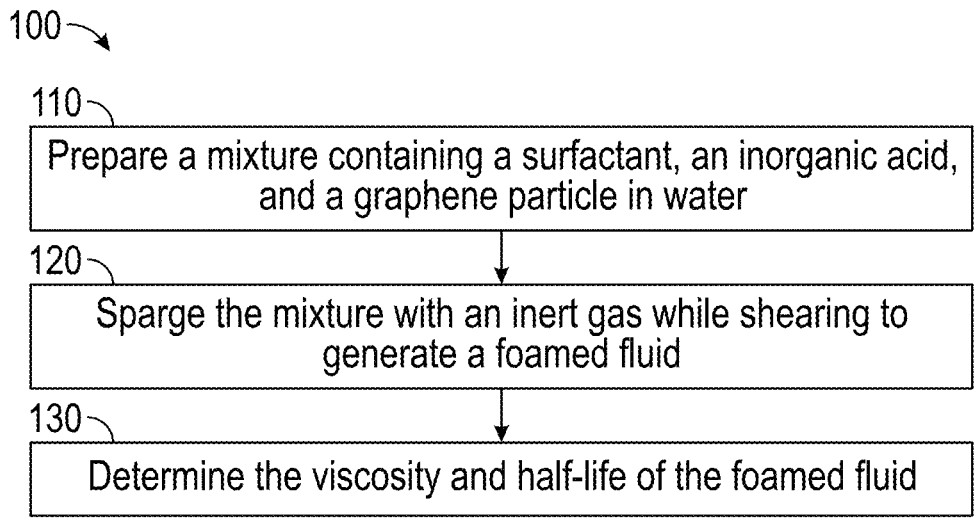
FIG. 1 is a block flow diagram of a method for preparing a foamed fracturing fluid comprising a surfactant, an inorganic acid, and a graphene particle in accordance with one or more embodiments.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Embodiments in accordance with the present disclosure generally relate to a method of making an acidic foamed fracturing fluid and methods of treating a hydrocarbon-bearing formation using these acidic foamed fracturing fluids. Fracturing fluids in accordance with the present disclosure include a base fluid, a graphene particle, one or more surfactants, and an inorganic acid. The disclosed fracturing fluids may exhibit increased fluid viscosity, coherent foam-film, and good stability for fracturing applications. The acidic foamed fluid may exhibit viscoelastic behavior under formation conditions. The present disclosure also generally relates to a method of generating an acidic foamed fracturing fluid comprising a graphene particle, one or more surfactants and an inorganic acid, and a method for stimulating a hydrocarbon-bearing formation by introducing the fracturing fluid into the hydrocarbon-bearing formation under a pressure greater than the fracturing pressure of the formation to generate fractures in the formation.

One of the main challenges of using foams in fracturing applications is the lack of thermal stability of foam at a high temperature. Foam bubbles tend to collapse because of foam's lamellae thinning, liquid drainage, and inter-bubble gas diffusion. Foams can be stabilized by lowering the permeability of gas components through foam film.

This can be achieved by increasing the quantity of adsorbed surfactant at the foam film by adding synergic agents or by reducing the contact area at the gas-liquid phase using nanoparticles in the foam composition. Graphene particles, being solid and chemically robust, can stabilize foam under harsh conditions such as high temperature and salinity. Thus, the foamed fracturing fluids disclosed herein may contain graphene particles, an inert gas, an inorganic acid and a base fluid. The foamed fracturing fluids disclosed herein may be particularly useful because they may require significantly less water when compared to conventional fracturing fluids. The foamed fracturing fluids may demonstrate increased stability under high temperature and pressure conditions, making them suitable for use in downhole environments.

Definitions

The term "wellbore" refers to a hole drilled into the surface of the earth. Wellbores are usually drilled in order to penetrate a reservoir that contains hydrocarbons, and such hydrocarbons may be recovered by extraction through a wellbore. A wellbore is also known as a borehole and may be cased with cement and/or steel to increase formation stability.

The term "fracturing" refers to an oil and gas well development process. The process usually involves several steps including injecting water, sand, and other chemicals under high pressure into a hydrocarbon-bearing formation through a wellbore. This process is intended to create new fractures in the rock as well as increase the size, extent, and connectivity of existing fractures. Fracturing is also known as hydraulic fracturing and fracking. It is used commonly in low-permeability rocks like tight sandstone, shale, and some coal beds to increase oil and/or gas flow to a well from petroleum-bearing rock formations and to create improved permeability in underground geothermal reservoirs.

The term "fracturing fluid" means a chemical mixture that is used in fracturing operations to increase the quantity of hydrocarbons that can be extracted. In such fracturing fluids, complex chemical mixtures having sufficient viscosity properties may be included to generate fracture geometry in the formation rock and transport solid proppants holding the fracture open. In this context, the viscosity of the hydraulic fracturing fluids may impact the fracture initiation, propagation, and resulting dimensions. Fracturing fluids may also contain proppants such as sand ("frac sand") or ceramic beads to hold open fractures created in the formation.

The term "foam" refers to an emulsion of a dispersed gas phase in a continuous liquid phase-stabilized using a surfactant or a foaming agent. In the present disclosure, nitrogen gas ($N_2$) and carbon dioxide ($CO_2$) are commonly used as gas phases while water-based fluid is used as liquid phase.

The term "foam quality" refers to a ratio of gas volume to foam volume (gas+liquid) at a certain pressure and temperature.

The term "thermal stability" means the ability of a fluid to maintain its chemical and physical characteristics, meaning its ability to resist chemical reactions or changes in the physical state under heat. For instance, a compound with greater stability has more resistance to decomposition at high temperatures. In the present disclosure, the term "thermally stable" refers to a foam that does not chemically degrade and is able to maintain various foam properties at high temperature. As used herein, "high temperature" refers to a temperature of at least 100° C. The foam requires thermal stability under the conditions of use, meaning downhole temperatures (for example, 100° C. or above). The rheological properties of a generated foam may be measured, for example, using a foam rheometer at ambient temperature and at reservoir temperature to test that the rheological properties do not degrade at high temperature.

The term "foam half-life" means the time required for a foam to lose half of its initial height. The foam half-life may be tested by generating a foam and then measuring the time it takes for the foam to collapse to half of its maximum height after being foamed.

Foamed Fracturing Fluid Composition

One or more embodiments of the present disclosure relate to an acidic foamed fracturing fluid composition. In one or more embodiments, the foamed fracturing fluid composition includes a graphene particle, one or more surfactants, an inorganic acid, an inert gas, and a base fluid. Thus, the foamed fracturing fluid in accordance with the present disclosure is an acidic foamed fracturing fluid.

As noted above, the foamed fracturing fluid includes graphene. The graphene of one or more embodiments can be provided by any synthetic method known to one of ordinary skill in the art, including mechanical exfoliation, chemical vapor deposition, and chemical reaction. Graphene for use in the composition described herein may also be purchased commercially.

Graphene has a layered structure in which one layer of carbon atoms are arranged in a two-dimensional honeycomb lattice. Owing to its ability to enhance several base fluid properties such as fluid flow, fluid loss control, wettability changes emulsion stabilizers, electrical, and thermal conductivity, graphene may be a particularly suitable component for a foamed fracturing fluid. Furthermore, the high surface areas per volume of graphene provides high interaction of the graphene with surrounding fluid molecules, as compared to other materials with a lower surface area. This surface area can serve as site for bonding with fluid molecules and influence composite crystallization, chain entanglement, and morphology; thus, can improve several properties in fluids.

Without wishing to be bound by a particular mechanism or theory, it is believed that in a foamed fluid, carbon atoms in the graphene are strongly interact with surfactant molecules to form a composite structure. Such a composite structure can work to enhance the foamed fluid's thermodynamic, physical, and rheological properties.

As is understood by those skilled in the art, graphene is a two dimensional material, meaning a graphene particle has a given length and width (or diameter in the case of roughly spherical particles), while the thickness is negligibly small (i.e., 1 to 10 atomic layers thick). In one or more embodiments, the graphene disclosed herein has a particle diameter that ranges from 0.1 microns to 1000 microns. For example, the graphene may have a diameter ranging from a lower limit of any of 0.1, 0.25, 0.5, 1.0, 5.0, 10, 50, 100, 250 and 500 microns to an upper limit of any of 1.0, 5.0, 10, 25, 50, 100, 200, 300, 500, 750, and 1000 microns, where any lower limit can be used in combination with any mathematically-compatible upper limit.

The graphene of one or more embodiments may have a suitable thickness. For example, in one or more embodiments, the graphene particle may have 1-3 layers of graphene, 2-5 layers of graphene, or 2-10 layers of graphene. In other embodiments, the graphene may have a thickness from 1-3 nanometers and in such instances the graphene particles may be referred to as graphene nanoplates. The graphene described herein may be characterized by the number of graphene layers, indicated as "L" with reference to the number of layers. For example, graphene may be monolayer graphene (L), several-layer graphene (<5 L), multilayer graphene (<10 L) or graphene nanoplatelets (>10 L). The thickness of a graphene sheet can be estimated using the equation d1=NΔd, where N represents the number of layers and Δd is the thickness of single layer graphene (Δd=0.335 nm). Examples of commercially available graphene in accordance with the present disclosure are available from Proton Power, Inc. Examples of such products include ProCene™ graphene and ProCNano™ nanoplatelets.

As is known by those skilled in the art, the number of layers of graphene in a graphene sheet, and therefore the thickness of the graphene sheet, can be achieved using various known synthetic techniques. For example, in chemical vapor deposition (CVD) processed, graphene can be grown on a copper substrate. In such instances, the copper surface that serves as the catalyst for graphene synthesis becomes covered with the graphene, which prevents the copper from catalyzing more graphene growth and thus inhibiting multilayer graphene growth. However, the use of Cu—Ni alloys as substrates allows for additional layers of graphene to be deposited. The presence of Ni in the Cu—Ni alloy helps to increase the carbon solubility in the alloy and thus promotes multilayer growth. In addition, it is possible to synthesize multi-layer graphene by either changing the carbon to hydrogen ratio or increasing the partial pressure of hydrogen during the CVD growth process. Furthermore, top-down methods of reducing graphene thickness to achieve the specific number of layers, including peeling layer-by-layer using Joule heating, mild nitrogen plasma irradiation, laser irradiation, and annealing in Ar/$O_2$, may also be employed to achieve a specific graphene sheet thickness and/or number of layers.

A suitable amount of graphene may be included in the composition to stabilize the foam. In one or more embodiments, graphene may be included in a range of from 0.1 to 10.0 vol/vol % (volume of graphene to volume of liquid in the foam). For example, the amount of graphene in the composition may have a lower limit of any of 0.1, 0.25, 0.5, 1.0, 2.5, and 5.0 vol/vol % to an upper limit of any of 5.0, 6.0, 7.0, 8.0, 9.0, and 10.0 vol/vol %, where any lower limit can be used in combination with any mathematically-compatible upper limit.

The graphene described herein may have different surface functionalities. For example, the graphene may be graphene, graphene oxide (GO, which is graphene that has oxygen-containing functional groups), reduced graphene oxide (rGO, which has a similar structure to GO, but has a lower oxygen content than GO), or functionalized graphene, which is graphene that has one or more surface functional groups. Functionalized graphene described herein may be functionalized with N-(trimethoxysilylpropyl) ethylenediamine triacetic acid (EDTA-silane), PMMA (poly (methyl methacrylate), for example. Additionally, graphene oxide may be functionalized with hydroxyl groups through esterification.

As noted above, the foamed fracturing fluid composition includes at least one surfactant. The surfactant may be selected for use in a particular downhole environment. As such, in one or more embodiments, the type of surfactant used will be selected based on its foamability, foam buildup, foam half-life, overflow of the foam, and thermal stability under the conditions in which it will be used. In one or more particular embodiments, the surfactant may be anionic, cationic, amphoteric (or zwitterionic), or nonionic, and combinations thereof. Examples of suitable cationic surfactants include amine-based surfactants (such as trimethylamine hydrochloride and octenide dihydrochloride) and quaternary ammonium salts (such as cetylpyridinium chloride and benzethonium chloride). Examples of anionic surfactant, include but are not limited to, sodium dodecyl sulfate (SDS), alkyl ethylene oxide sulfates (for example, a sulfate with three ethylene oxide groups), alkylbenzene sulfonate (such as sodium dodecylbenzene), substituted sulfosuccinates (such as diethylhexyl sodium sulfosuccinate or dioctyl sodium sulfosuccinate), alkyl phosphates, salts of fatty acids, and alpha-olefin sulfonates (AOS). Examples of nonionic surfactants include but are not limited to, fatty alcohol ethoxylate, alkyl phenol ethoxylate, and fatty acid alkoxylate. Lastly, examples of amphoteric surfactants include, but are not limited to, alkylamidopropylamine N-oxide (APAO), alkyldimethylamine N-oxide (AO), alkylbetaine (Bt), alkylamidopropylbetaine (APB), cocamidopropyl betaine, cocoamphoacetate, and cocoamphodiacetate.

In one or more embodiments, the surfactant may be thermally stable at a temperature of 250° F. or more, 300° F. or more, 350° F. or more, or 375° F. or more, as measured by thermogravimetric analysis (TGA). The TGA measurement method as used herein measures the change in the weight of a specimen with a change in the temperature, and the thermal stability is calculated based on the weight loss and the heat transfer rate of the material.

In one or more embodiments, the surfactant may be highly soluble in aqueous solutions, such as in deionized water, seawater, brines, calcium chloride solutions, and the like, and also highly soluble in oils. In some embodiments, the surfactant may be soluble in both aqueous solutions and oils in an amount of 10% by weight (wt. %) or more, 20 wt. % or more, 30 wt. % or more, or 40 wt. % or more at ambient temperature. In some embodiments, the solubility of the surfactant may increase with increasing temperature.

In one or more embodiments, the surfactant may be present in the foamed fracturing fluid composition in an amount of about 1.0 vol/vol % to 10.0 vol/vol % based on the total volume of the liquid in the foamed fracturing fluid. For example, the surfactant may be included in an amount ranging from a lower limit of any one of 1.0, 1.5, 2.0, 2.5, 3.0, 3.5, 4.0, 4.5, and 5.0 vol/vol % to an upper limit of any one of 5.0, 5.5, 6.0, 6.5, 7.0, 7.5, 8.0, 8.5, 9.0, 9.5, and 10.0 vol/vol % based on the total volume of liquid in the foamed fracturing fluid.

The foamed fracturing fluids of one or more embodiments include a base fluid. In one or more embodiments, the base fluid may be a water-based fracturing fluid. In one or more embodiments, the water-based fracturing fluid may comprise an aqueous fluid. The aqueous fluid may include at least one of freshwater, seawater, brine, water-soluble organic compounds, and mixtures thereof. The aqueous fluid may contain freshwater formulated to contain various salts. The salts may include but are not limited to, alkali metal halides and hydroxides. In one or more embodiments, the aqueous fluid may be a brine that may be any of seawater, aqueous solutions wherein the salt concentration is less than that of seawater, or aqueous solutions wherein the salt concentration are greater than that of seawater. Salts that are found in seawater may include sodium, calcium, aluminum, magnesium, potassium, strontium, and lithium salts of halides, carbonates, chlorates, bromates, nitrates, oxides, phosphates, among others. Any of the aforementioned salts may be included in brine. In one or more embodiments, the density of the aqueous fluid may be controlled by increasing the salt concentration in the brine, though the maximum concentration is determined by the solubility of the salt. In one or more embodiments, the quality of water as the aqueous fluid may not significantly reduce foam stability.

In one or more embodiments, the foamed fracturing fluid includes at least an inorganic acid. Inorganic acids may be included when the fracturing fluid is to be used in a matrix stimulation process, as described below. The inorganic acid may be any suitable inorganic acid known to a person of ordinary skill in the art, and its selection may be determined by the intended application of the fluid. An inorganic acid (also called a mineral acid) is an acid derived from one or more inorganic compounds. In some embodiments, the inorganic acid may be selected from the group consisting of hydrochloric acid, sulfuric acid, nitric acid, perchloric acid, boric acid, hydrofluoric acid, phosphoric acid, and chlorosulfonic acid. The acids may be used alone or in combination.

Additionally, a crosslinked acid, a gelling acid, and emulsified acid and/or a self-diverting acid may be included in the foamed fracturing fluid. A crosslinked acid is an acid in which linear hyaluronic acid molecules are crosslinked together to obtain structures consisting of several hyaluronic acid filaments with a higher molecular weight than conventional acid systems. A gelling acid is a suspension of a high-viscosity synthetic polymer that is useful in thickening hydrochloric acid, brines or fresh water. An emulsified acid is a viscous, highly retarded HCl system designed to overcome acid penetration problems while stimulating reservoirs above 75° F. A diverting acid is a self-diverting, polymer-free acidizing fluid that can be used alone or with other acids to maximize zonal coverage in carbonate reservoirs. It viscosifies as it stimulates carbonate formations, diverting the remaining acid treatment fluid into zones of lower injectivity. Any of these particular acid systems may be employed in the foamed fracturing fluid as needed based on the application.

The foamed fracturing fluid of one or more embodiments may comprise one or more inorganic acids in a total amount of the range of about 15 vol/vol % to 30 vol/vol % based on the total volume of liquid in the foamed fracturing fluid. For example, the acid may be included in an amount having a lower limit of any one of 15, 16, 17, 18, 19, 20, 21, 22, 23, 24 and 25 vol/vol % to an upper limit of any one of 20, 21, 22, 23, 24, 25, 26, 27, 28, 29, and 30 vol/vol % based on the total volume of liquid in the foamed fracturing fluid, where any lower limit may be paired with any mathematically compatible upper limit.

In one or more embodiments, the foamed fracturing fluid may further include various additives useful for foamed fracturing fluid application. For example, the fracturing fluid may include a chelating agent, a corrosion inhibitor, an anti-sludge compound, and/or a demulsifier.

In one or more embodiments, the fracturing fluid includes a corrosion inhibitor. Corrosion inhibitors are surface-active compounds that form protective coatings on the surface of metal components that come in contact with corrosive environments and thus suppress corrosion. Any corrosion inhibitor known to one person skilled in the art may be incorporated into the foamed fracturing fluid composition. Non-limiting examples of such corrosion inhibitors may include amines, condensation products of fatty acids with polyamines, e.g. imidazolines or polyamides, quaternary ammonium compounds, silicate salts, phosphate salts, etc.

The foamed fracturing fluid of one or more embodiments may include a corrosion inhibitor in a total amount of the range of about 0.1 to 1.0 wt % based on the total weight of the foamed fracturing fluid.

In one or more embodiments, the fracturing fluid may include an anti-sludge compound. Any anti-sludge compound known to one person skilled in the art may be incorporated into the foamed fracturing fluid composition. Non-limiting examples of such anti-sludge compounds include surfactants, blends of cationic and nonionic surfactants, anionic surfactants, blends of anionic and nonionic surfactants, and salts of surfactants. For an example, both dodecyl benzene sulfonic acid (DDBSA), and salts of dodecyl benzene sulfonic acid (DDBSA) may be used as anti-sludge compounds.

The foamed fracturing fluid of one or more embodiments may include an anti-sludge chemical in a total amount of the range of about 0.5 to 2.0 vol % based on the total volume of liquid in the foamed fracturing fluid.

In one or more embodiments, the fracturing fluid may optionally include a demulsifier, or emulsion breaker. The demulsifier may be included in an amount ranging from about 1 to 10 vol % based on the total volume of liquid in the foamed fracturing fluid.

In one or more embodiments, the foamed fracturing fluids may also include one or more chelating agents. Non-limiting examples of such chelating agents include α-hydroxy carboxylic acids (e.g., glycolic acid, gluconic acid, lactic acid, and citric acid) and high-pH amino carboxylic acids such as tetrasodium EDTA, tetrasodium GLDA, and disodium HEIDA.

The foamed fracturing fluid of one or more embodiments may comprise a chelating agent in a total amount of the range of about 1.0 to 3.0 vol % based on the total volume of liquid in the foamed fracturing fluid.

As noted above, foamed fracturing fluids described herein include a gas. The foamed fracturing fluid composition may be prepared by flowing gas into a liquid solution. The liquid solution includes the components as described above. The inert gas may be nitrogen gas ($N_2$) or carbon dioxide gas ($CO_2$). In some instances, air may be used for generating foams in a fracturing fluid composition.

The gas flow rate, time of flowing gas, and amount of gas needed to generate foam in a fluid may depend on the environment such as temperature and pressure, fluid properties including but not limited to the fluid density, viscosity, and present solid particles. Nitrogen gas may be particularly suitable for generating foam due to its chemical inertness and relative abundance.

In one or more embodiments, the foamed fracturing fluid may include the gas in an amount of 50 to 90% by volume, where the volume percentage is given as the volume of the gas divided by the total volume of the foam (meaning gas plus liquid). For example, in one or more embodiments, the foamed fracturing fluid may include the gas in an amount having a lower limit of any one of 50, 55, 60, 65, 70, and 75 vol % and an upper limit of any one of 70, 75, 80, 85, and 90 vol % based on the total volume of the foam, where any lower limit may be paired with any mathematically compatible upper limit.

The foamed fracturing fluids may be used alone to fracture the formation. Alternatively, they may be used with a sufficient quantity of a proppant. Such proppants may include gravel, sand, bauxite, or glass beads. Proppants may be uncoated or coated with resins such as epoxy, furan, novolak, polyepoxide resins, furan/furfuryl alcohol resins, phenolic resins, urea-aldehyde resins, urethane resins, phenolic/latex resins, phenol-formaldehyde resins, polyester resins and acrylate resins, and copolymers and mixtures thereof. The particle size of the proppants may be from about 2 to about 400 mesh U.S. Sieve Series.

Properties of the Foamed Fluid

The foams described herein may have particularly advantageous properties for use in acid fracturing applications. For example, the foams may have high foam quality. Foam quality under certain pressures and temperatures may be determined by measuring the ratio between gas volume and the total foam volume including gas and liquid phases. Foam quality may be used as an important factor in determining foam stability and viscosity. As used herein, foam quality (Γ) as defined above is the ratio of gas volume to gas/liquid volume over a given temperature and pressure, and may be determined using Equation (I) below:

$$\Gamma = \frac{100 V_g}{V_g + V_l} \quad \text{(I)}$$

where $V_g$ is the gas volume and $V_l$ is the liquid volume.

In one or more embodiments, foams of the present disclosure may have a foam quality ranging from 50% to 90% at a temperature ranging from 120° C. to 165° C. For example, the foam quality of disclosed foams may have a value range having a lower limit of one of 50, 55, 60, 65, and 70% and an upper limit of one of 60, 65, 70, 75, 80, 85 and 90%, where any lower limit may be paired with any mathematically compatible upper limit. [Generally, the temperature and pressure of the wellbore increases as the wellbore gets deeper. Therefore, in one or more embodiments, the foams are required to be thermally stable in order to stimulate downhole environments where the temperature is high. The foam may be thermally stable under the conditions of use, meaning downhole temperatures and pressures. For example, in one or more embodiments, the foam may be thermally stable at a temperature range of from about 120° C. to 165° C., making it suitable for downhole conditions. The foam may be thermally stable at a temperature range having a lower limit of any one of 120, 121, 122, 123, 124, 125, 126, 127, 128, 129, 130, 135, 140, 145, and 150° C., and an upper limit of any one of 135, 140, 145, 150, 155, 156, 157, 158, 159, 160, 161, 162, 163, 164, and 165° C., where any lower limit may be paired with any mathematically compatible upper limit. However, as will be appreciated by those skilled in the art, the foam may be thermally stable under a different temperature range depending on the specific downhole conditions.

In one or more embodiments, foams described herein may have a suitable foam half-life to be effectively used as fracturing fluids. The foam may have a half-life in a range of from 130 minutes to 260 minutes when tested at a temperature of 200° F. For example, the foam half-life may have a lower limit of any one of 130, 140, 150, 160, 170, 180, and 190 minutes and an upper limit of any one of 200, 210, 220, 230, 240, 250 and 260 minutes, where any lower limit may be paired with any mathematically compatible upper limit.

Foam viscosity is another key parameter in determining the effectiveness for use in the methods disclosed herein. Foam viscosity may be determined as follows. A mixture of liquid and gas is circulated through a helically coiled loop in a foam rheometer and the differential pressure across the coil is used to measure foam viscosity. Foam viscosity may be measured at different shear rates, as will be indicated for specific viscosity measurements.

In one or more embodiments, at a temperature range of 275-350° F., the foamed fracturing fluid composition including 3.0 vol/vol % graphene and 4.0 vol/vol % surfactant with hydrochloric acid may have a viscosity in a range from 20 to 40 cP (centipoise) at 300 1/s shear rate and 70% $N_2$ quality. For example, the foamed fracturing fluid composition may have a viscosity at 275-350° F. at a shear rate of 300 1/s, ranging from a lower limit of any of 20, 21, 22, 23, 24, 25, 6, 27, 28, 29, 30, 31, 32, 33, 34, and 35 cP to an upper limit of any of 25, 26, 27, 28, 29, 30, 31, 32, 33, 34, 35, 36, 37, 38, 39 and 40 cP, where any lower limit can be used in combination with any mathematically compatible upper limit. Unless indicated otherwise, all viscosity values are obtained by using a foam loop rheometer (Chandler Engineering, model 8500-3 K).

In one or more embodiments, a foamed fracturing fluid composition comprising graphene particles with surfactant and acid may show higher viscosity compared to foamed fracturing fluid composition comprising surfactant and acid only under elevated temperature. For example, a foamed fracturing fluid at a temperature of 350° F., the foamed fracturing fluid composition including 3.0 vol/vol % graphene and 4.0 vol/vol % surfactant with hydrochloric acid may have a viscosity of about 45 cP at 300 1/s shear rate and 70% $N_2$ quality. In contrast, a foamed fracturing fluid at a constant temperature of 350° F., the foamed fracturing fluid composition comprising 4.0 vol/vol % surfactant with hydrochloric acid may have a viscosity of only about 20 cP at 300 1/s shear rate and 70% $N_2$ quality.

The rheological behaviors of the foams before and after drainage can be described as the power law model. Foams are considered non-Newtonian fluids since their internal flow resistance depends on the external force, such as the shear rate that acts upon the fluid. The flow of foams reflects shear-thinning behavior where the foam's apparent viscosity decreases with an increased shear rate. The influence of shear rate on foam stability depends on the strength and the duration of the external force. As such, a foam's apparent viscosity can be decreases gradually by increasing the shear rate due to the strong bonding of the inner molecular in the stabilizer structure. A highly viscous foam features tightly linked molecules that resist deformation. However, temperature plays a role in the foam's flow behavior. Increasing temperature can cause weak molecular bonds in molecules in the foam, which enhances the foam drainage process. Under the effect of gravity, the liquid flows faster downward through the foam, and the foam liquid content decreases with time. Liquid is drained out of the foam over time, leaving it dry and fragile.

Preparation of Foamed Fracturing Fluids

A method of preparing a foamed fracturing fluid of one or more embodiments is depicted by FIG. 1. All components and quantities discussed in relation to said method correspond to those discussed previously. In one or more embodiments, a mixture containing a graphene particle, a surfactant and an inorganic acid may be prepared in a base fluid in step 110. The mixture may be made by any suitable mixing method known in the art with amounts as described previously. The components of the mixture may be added and mixed in any order. Next, the mixture is sparged with an inert gas while shear mixing to generate a foamed fluid in step 120. A foamed fluid may be generated by passing gas into the mixture while shearing the mixture under a certain shear rate. As gas bubbles form inside the fluid mixture, the surfactant helps generate foam, and the graphene particles provide stability to the foam under a range of temperatures and pressure. Finally, the viscosity and half-life of foams may optionally be determined in step 130.

Method of Fracturing or Stimulating a Well Using Foamed Fracturing Fluids

Figure 2A:
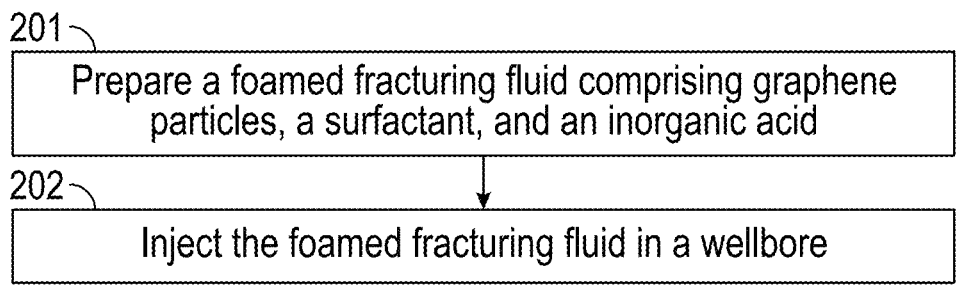
FIGS. 2A and 2B are block flow diagrams of methods for stimulating a wellbore using a foamed fracturing fluid in accordance with one or more embodiments.
Figure 2B:
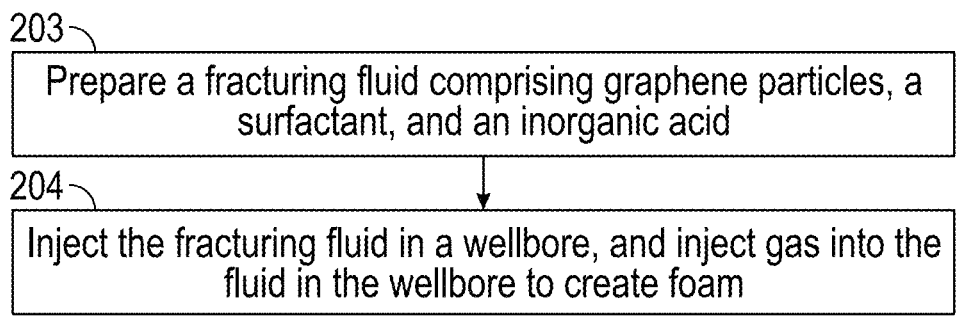

A method of stimulating a wellbore using a foamed fracturing fluid of one or more embodiments is depicted in FIGS. 2A and 2B. A foamed fracturing fluid may be prepared prior to injecting into a wellbore in step 201 as described above. Then, the foamed fracturing fluid may be injected into the wellbore in step 202. In one or more embodiments, a liquid fracturing fluid formulation may be prepared by mixing methods known in the art in step 203. The liquid formulation may contain all components of the fracturing foam except for the gas. Then the liquid formulation may be injected into the wellbore followed by the injection of the gaseous phase into the wellbore in step 204. In such embodiments, the foam may be generated in-situ in the wellbore.

A formation may be fractured by using the foamed fracturing fluids according to one or more embodiments. The foamed fracturing fluid may be injected into the wellbore at a pressure that may overcome the native overburden pressure of the formation, thus resulting in fracturing. The well may first be treated with a salt solution to help stabilize the formation prior to injection of the foamed fracturing fluids.

Methods in accordance with the present disclosure may include the injection of a foamed fracturing fluid into a formation. In one or more embodiments, the foamed fracturing fluid may be a single treatment fluid that is injected into the wellbore in one pumping stage. In other embodiments, methods in accordance with one or more embodiments may involve the injection of the foamed fracturing fluid and one or more additional stimulation fluids. The additional stimulation fluids may, in some embodiments, be co-injected with the foamed fracturing fluid. In some embodiments, the stimulation fluids may be injected after the foamed fracturing fluid.

The methods of one or more embodiments of the present disclosure may further comprise a pre-flushing step before the injection of the foamed fracturing fluid. The pre-flushing step may comprise flushing the formation with a flushing solution that comprises one or more surfactants. The flushing solution may be an aqueous solution, and the surfactant may be the same surfactant as included in the foamed fracturing fluid. The pre-flushing may limit the adsorption of the surfactants on the rock surface of the formation during the injection process. The suitability of the use of a pre-flushing step may depend on the type of surfactant and rock.

The methods of one or more embodiments may be used for well stimulation. A well stimulation process in accordance with one or more embodiments of the present disclosure may include the step of injecting the foamed fracturing fluid into a hydrocarbon-bearing formation at an injection well. In some embodiments, the injection of the foamed fracturing fluid may be performed at a pressure that is below the fracturing pressure of the formation. A zone within the formation may be at a high temperature and increase the viscosity of the foamed fracturing fluid. After the increase in viscosity, the tail-end of the fluid is diverted to lower-permeability zones of the formation, displacing hydrocarbons. This results from the increase in viscosity that may "plug" the more permeable zones of the formation. The formation may be stimulated by the foamed fracturing fluid, creating pathways for hydrocarbon production. According to some embodiments, the displaced hydrocarbons may be recovered through the stimulated reservoir. In one or more embodiments, the hydrocarbons may be recovered at a production well.

The well stimulation process of one or more embodiments may be a matrix stimulation process in which acid is used. The acid fluid may react with the formation, dissolving rock, and creating wormholes that create a pathway for hydrocarbons to be displaced from deeper within the rock. In one or more embodiments, the foamed fracturing fluid may have a high viscosity in the formation, enabling the fluid to better penetrate lower-permeability zones of the formation and allowing the acid to more uniformly react with the entire formation, and eventually drop in viscosity. This may provide for the formation of deeper wormholes and enhance the overall permeability of the near-wellbore region. In the absence of this initial high viscosity, the fluid will primarily penetrate the high permeability zones.

In one or more embodiments, the well stimulation process may be repeated one or more times to increase the amount of hydrocarbons recovered. The methods of one or more embodiments may advantageously provide improved sweep efficiency.

Embodiments disclosed herein may be useful when applied to unconventional reservoirs. Unconventional reservoirs may be defined as those formations wherein hydrocarbon recovery is not economically possible without the implementation of specialized stimulation treatments such as matrix acidizing or fracturing. Unconventional reservoirs such as shale gas, tight sands, heavy oil, and tar sands are some examples of formations that need specialized stimulation for hydrocarbon production.

Although the embodiments disclosed herein focus on accessing unconventional reservoirs, the following embodiments and disclosure can be applied to any formations that would be receptive to the methods and systems disclosed.

Embodiments disclosed herein may be useful over a wide range of downhole conditions, including temperatures of up to about 350° F., such as up to about 325° F., up to about 300° F., up to about 250° F., or up to about 200° F. In one or more embodiments, the formation may have a temperature ranging from about 50 to 350° F. For example, the formation may have a temperature that is of an amount ranging from a lower limit of any of 50, 60, 70, 80, 90, 100, 150, 200, 250, and 300° F. to an upper limit of any of 100, 150, 200, 250, 300, and 350° F., where any lower limit can be used in combination with any mathematically-compatible upper limit.

Downhole pressures may be from about 50 pounds per square inch (psi) (0.345 megapascals (MPa)) to about 30,000 psi (206 MPa), such as from about 100 psi (0.689 MPa) to about 30,000 psi, from about 1,000 psi (6.90 MPa) to about 30,000 psi, from about 50 psi to about 20,000 psi (138 MPa), from about 100 psi to about 20,000 psi (68.9 MPa), from about 1,000 psi to about 20,000 psi, from about 50 psi to about 10,000 psi, from about 100 psi to about 20,000 psi, or from about 1,000 psi to about 10,000 psi.

The following examples are merely illustrative and should not be interpreted as limiting the scope of the present disclosure.

EXAMPLES

Materials

A surfactant was utilized for producing foamed fracturing fluid compositions. The surfactant is Armovis® EHS obtained from Nouryon. Graphene with 92 wt % carbon and 7 wt % oxygen used for the examples. Graphene having the commercial name ProCNano™ was supplied by Proton Power Inc. Hydrochloric acid was used obtained from VWR. Nitrogen gas was used for generating foam in the acidic, surfactant-graphene particles mixture.

A foam loop rheometer was utilized to investigate the effect of dynamic conditions on foam's stability and rheological properties. Several tests were conducted at shear rates of 300 $S^{-1}$, 275-350° F., 1050 psi, and 70% $N_2$ quality using a model 8500-3 K rheometer from Chandler Engineering.

Preparation of Foam

An exemplary foam including graphene and surfactant was prepared by mixing 3 vol/vol % of graphene, 4 vol/vol % of surfactant, and 23 vol/vol % of HCl in 500 ml of deionized water. The mixture was stirred for 30 minutes at a high shear rate using a waring blender (Torrington Connecticut, 06790) to ensure a homogeneous mixture of particles in the fluid. This sample is Test Sample (b) in Table 1.

Similarly, a comparative foam sample was prepared with 4 vol/vol % of surfactant and 23 vol/vol % of HCl in 500 ml of deionized water using the waring blender method. This sample is Test Sample (a) in Table 1. The composition of tested foamed fracturing fluid samples are shown in Table 1 below:

TABLE 1

Composition of Samples tested

| Test Sample | graphene particles concentration | hydrochloric acid concentration | surfactant concentration |
|---|---|---|---|
| (a) surfactant with hydrochloric acid | 0 vol/vol % | 23 vol/vol % | 4 vol/vol % |
| (b) graphene, surfactant with hydrochloric acid | 3 vol/vol % | 23 vol/vol % | 4 vol/vol % |

Example 1: Foam Characterization Test Results

In the conventional foam fracturing process, first foam is generated on the surface and then is injected into a well formation. The temperature of the foamed fracturing fluid increases with increasing the depth of the well and reaches the highest temperature under the target formation. Static foam stability may deteriorate at high temperatures due to thermal degradation, and therefore, may result in decreased efficiency of the foamed fracturing fluid. In order to predict the effectiveness of a foamed fracturing fluid, the half-life time of foamed fluid at different temperatures was tested. Static foam tests were used to evaluate the effects of introducing graphene particles on the surfactant, and acid foam stability and rheological characteristics.

To test the performance of the foamed fluid composition, the prepared foams were transferred to a sealed cylinder to record the foam decaying time (measuring foam-volume altering with time), at 77-200° F., using an oven at atmospheric pressure.

A foam loop rheometer was used to evaluate the dynamic rheology and stability of the samples. Samples (a), and (b) from Table 1 were tested. The apparent viscosity was measured by at 275-350° F., 1050 psi, and 70% $N_2$ quality. All tests were conducted under shear rate of 300 1/s. A high-resolution optical microscope was used to observe the foam film morphological properties.

Example 2: Foam Stability Results

Figure 3A:
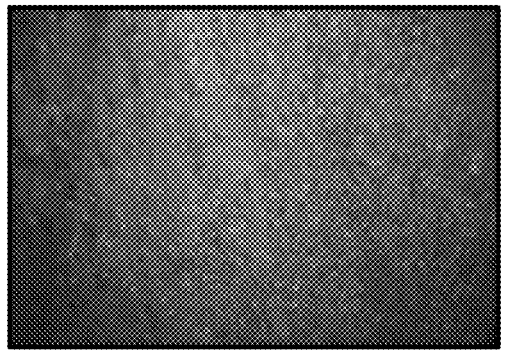
FIGS. 3A-3C are microscope images of comparative foam-films generated by a foamed composition in accordance with one or more embodiments.
Figure 4A:
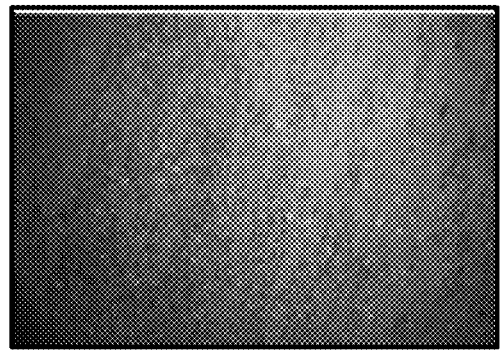
FIGS. 4A-4C are microscope images of foam-films generated by a foamed composition in accordance with one or more embodiments.
Figure 3B:
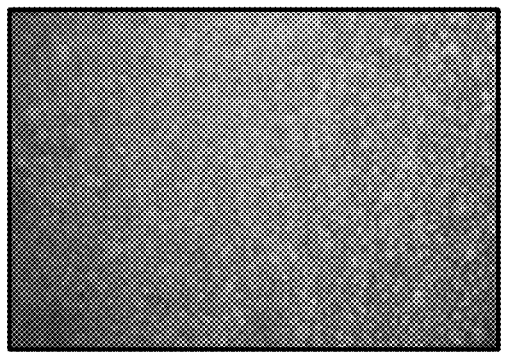
Figure 4B:
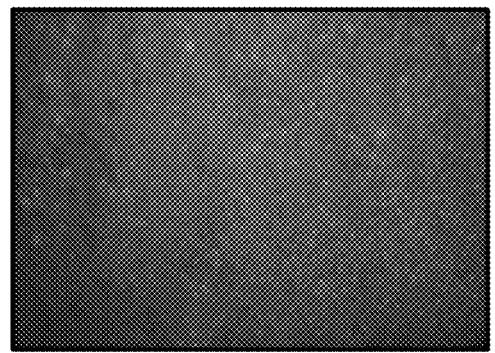
Figure 3C:
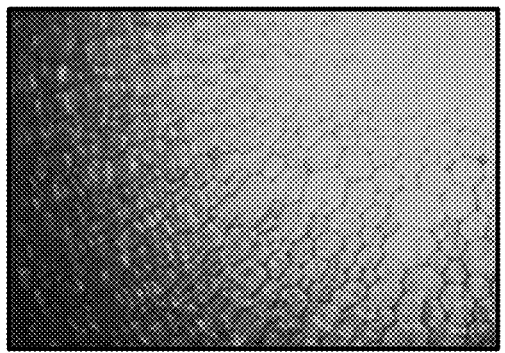
Figure 4C:
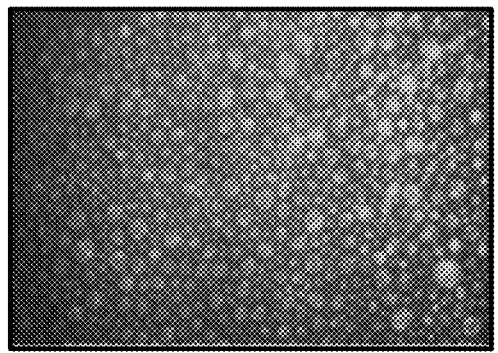

The dynamic foam stability was studied from the change of the foam film morphology with time. FIGS. 3A-3C and FIGS. 4A-4C show high resolution images of foamed fracturing fluids of test samples (a) (FIGS. 3A-3C) and (b) (FIGS. 4A-4C). For test sample (a) (FIGS. 3A-3C, no graphene), at the start of the screening test, the bubbles presented a small, regular shape and substantial population. However, after 30 min of screening time, the bubbles started to expand and adopted a hexagonal shape with a reduced population. This population reduction can be attributed to the coalescing force between the bubbles due to the interference between the different bubble sizes driven by the pressure difference (Young-Laplace phenomenon). In contrast, the foam bubbles of test sample (b) (FIGS. 4A-4C including graphene) retained their regular spherical shape and large population for approximately-four hours. The microscopic images reveal that the robust foam microstructure is because of the substantial adsorption properties, high specific surface area, and temperature resistance of GO at high temperatures. The graphene bonding with the surfactant provided a nanocomposite structure that prevented coalescence and surface rupture of the foams as compared to the sample without graphene.

The interfacial integration mechanism of the graphene particles surfactant foam bubbles may be based on combining two components at the nano/micro-level to create a barrier that held the foam film (lamella). Without wishing to be bound by any particular mechanism or theory, it is believed that graphene particles and surfactant molecules may accumulate together to arrange one single layer between the foam film and the liquid phase which may increase the flow resistance of water between bubbles and slow the liquid drainage, as illustrated in FIGS. 3A-3C. The surfactant may enhance the foam-viscosity by connecting its molecules to the graphene particles, and thus may interrupt the destabilization mechanisms such as drainage of the liquid in the lamella film, coalescence of neighboring bubbles (lamella rupture), and Ostwald ripening. For example, the foam-film structure of test sample (b) was stable for 1 hour 40 min. The graphene particles were absorbed in the bubble surface and enhanced the capability of the film to resist deformation. The number of bubbles in the graphene particles with surfactant foam was decreased slightly during the time measured. However, the foam film remained stable for about 1 hour 40 min. Therefore, the overall effectiveness of the foamed fluid remained high for being utilized as a fracturing fluid.

Table 2 shows thermal stability test results of the half-life of foams including graphene particles at different concentrations with constant acid and surfactant concentrations.

TABLE 2

Half-Life Data

| Sample | Half-Life at Various Testing Temperatures | | |
|---|---|---|---|
| | 77° F. | 150° F. | 200° F. |
| Acid + surfactant-based foam | 240 | 180 | 120 |
| Acid + Surfactant + 1 wt % Graphene based foam | 480 | 300 | 210 |

Example 3: Foam Dynamic Stability Results

Figure 5A:
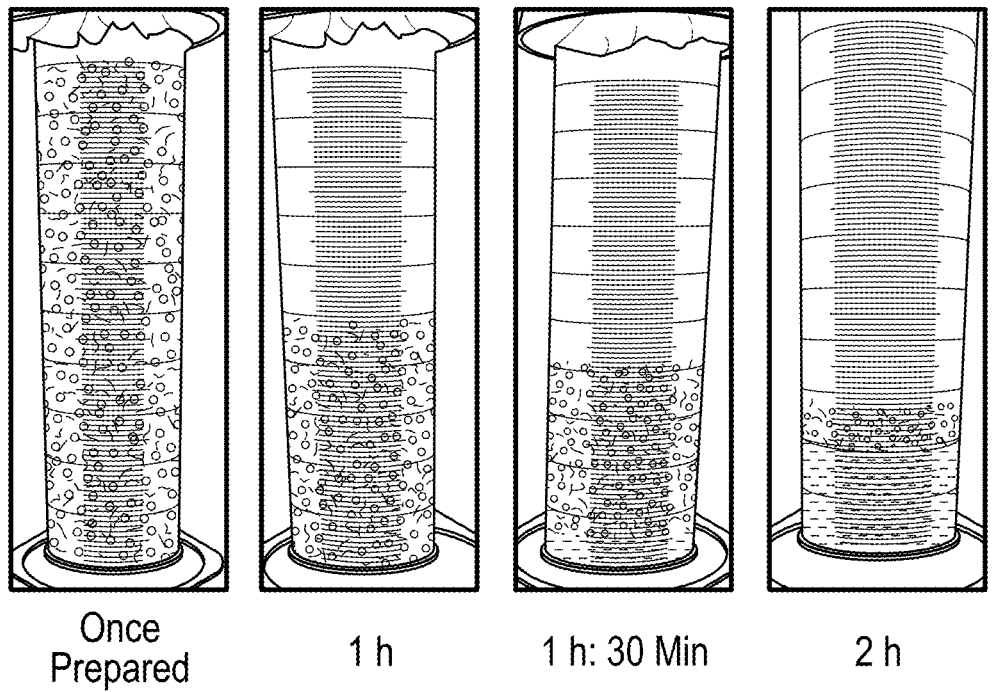
FIGS. 5A and 5B are photographs of the foam decay of the foamed fracturing fluid foams with time in accordance with one or more embodiments.
Figure 5B:
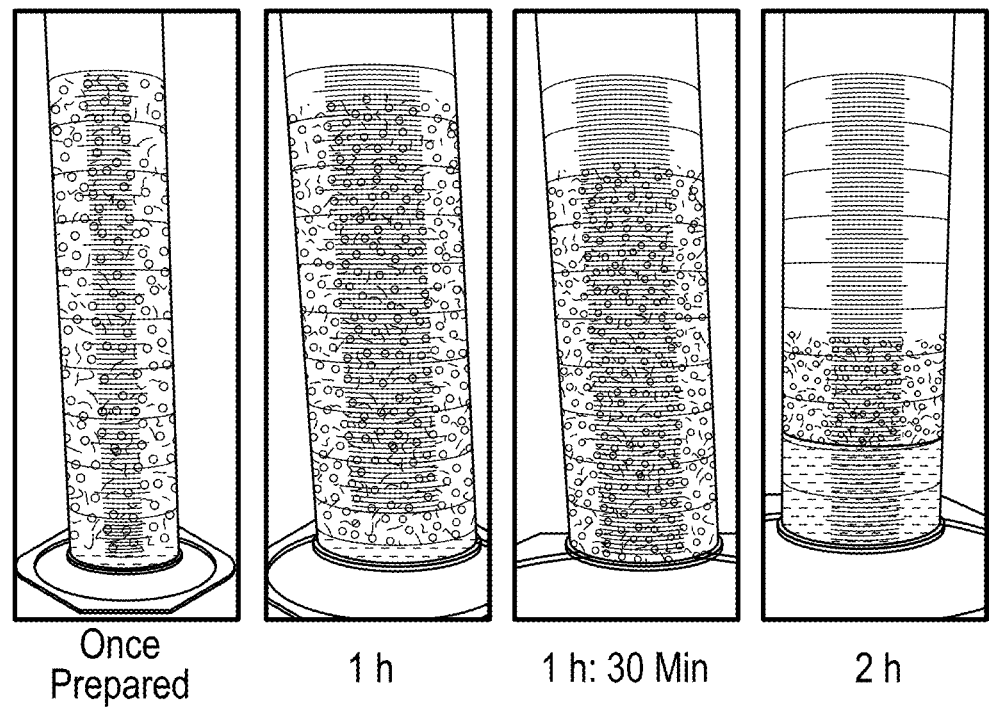

FIGS. 5A and 5B show photographs of the progress of half-life tests. The samples from Table 1 were tested. FIG. 5A shows the results for test sample (a) and FIG. 5B shows the results for test sample (b). The foam decay, and their half-life-time were observed and measured at 200° F.

Sample (a) (FIG. 5A) foam volume decreased more quickly with passing the testing time. Also, the water phase volume increased with increasing the testing time which reflected the lack of stability of sample (a). In contrast, foam-bubbles of sample (b) (FIG. 5B) were smaller in size and had a higher foam density compared to sample (a). The visual stability of the foam was also better for sample (b) compared to sample (a).

Example 4: Foam Viscosity Results

Figure 6:
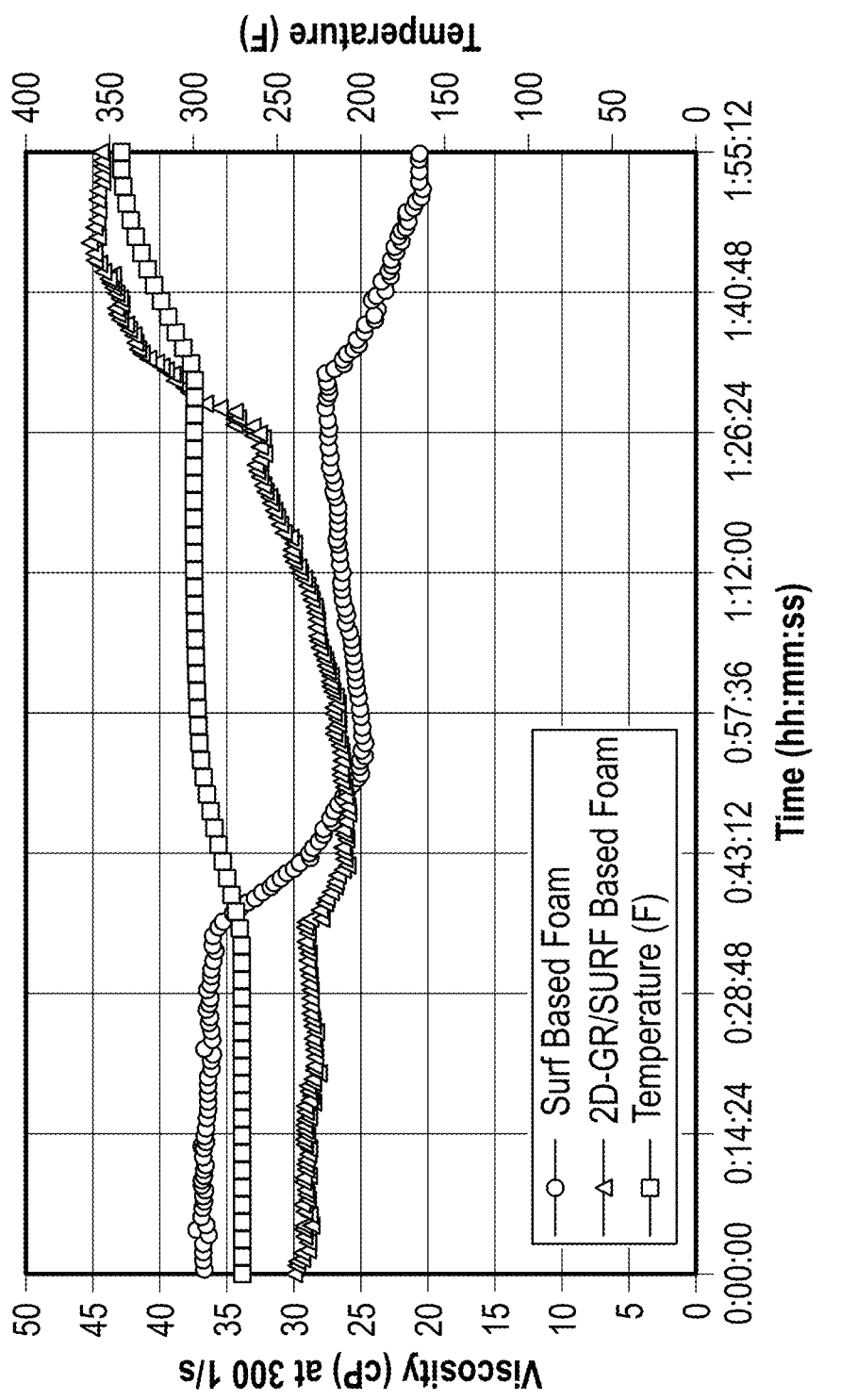
FIG. 6 is a graphical representation of the apparent viscosity of different foamed fluid compositions with respect to time and temperature changes in accordance with one or more embodiments.

FIG. 6 shows a comparison of the viscosity of the foamed fluid compositions of sample (a) and (b) as above with increasing temperature. When the temperature was increased to about 275° F., the viscosity of sample (a) decreased dramatically, and it decreased even further at a temperature of greater than about 300° F. In contrast, the viscosity of sample (b) increased at around 275° F. and increased even further at a temperature of around 300° F. The higher viscosity reflects the higher stability of the composition at elevated temperature. This may be attributed to the high thermal conductivity and stability of the graphene of sample (b) that helps to support foam-film and avoiding drainage at high temperatures.

Advantages

Embodiments of the present disclosure may provide at least one of the following advantages. Foamed fluid compositions described herein may provide greater stability at the high temperatures and pressures required for fracturing applications, particularly in unconventional reservoirs. The foamed fracturing fluid described herein may not require the addition of viscosifying agents or cross-linkers, or other additives to support the foam lamella film. Finally, the proppant transport ability of foamed fluid compositions described herein may be comparable to the other traditional fluids that have been used in the hydraulic fracturing process.

Foamed fracturing fluids have several advantages over conventional stimulation fluids. In particular, they are suitable for stimulating depleted reservoirs and water-sensitive formations, and they provide a shortened flow back period. Moreover, freshwater consumption is significantly reduced due to the addition of gas. Foamed fluids can be applicable in drilling, hydraulic fracturing, acidizing, artificial lifting, removing condensate banking, diverting fluids, enhanced oil recovery, steam-foams for heavy oil and bitumen recovery, etc. In fracturing applications, foamed fracturing fluid offers distinct advantages such as excellent proppant transport, solid free fluid loss control, minimum fluid retention due to low-water content of foam, compatibility with reservoir fluids, low hydrostatic pressure to returned fluids giving faster cleanup and gas in foam helps in returning liquids to the wellbore. In acid fracturing applications, foamed acid offers additional benefits such as retardation, deeper conductivity generation, reduced water consumption, and improved acid diversion.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims.

What is claimed is:

1. A foamed composition, the composition comprising:
a base fluid;
a graphene particle;
1.5 to 10.0 vol/vol % of one or more surfactants;
a gas; and
15 to 30 vol/vol % of hydrochloric acid;
wherein the foamed composition has a foam quality in a range from 50 to 90 vol/vol % at a temperature in a range from 120° C. to 165° C.,
and
wherein the foamed composition has a half-life of 130 min to 260 min at 200° F.

2. The composition of claim 1, wherein the one or more surfactants are selected from the group consisting of anionic, nonionic, cationic, and amphoteric surfactants.

3. The composition of claim 1, wherein the graphene particle is present in an amount of from 0.1 to 10.0 vol/vol % of the composition.

4. The composition of claim 1, wherein the gas is present in an amount of from 50 to 90 vol % based on a total volume of the composition.

5. The composition of claim 1, further comprising a compound selected from the group consisting of a chelating agent, a corrosion inhibitor, an anti-sludge compound, a demulsifier, and combinations thereof.

6. The composition of claim 1, wherein the composition has a viscosity in a range from 25 to 38 cP at a temperature of 275-350° F. and a shear rate of 300 $s^{-1}$.

* * * * *